No. 701,033. Patented May 27, 1902.
J. GRANGER.
REIN HOLDER.
(Application filed Feb. 21, 1902.)
(No Model.)
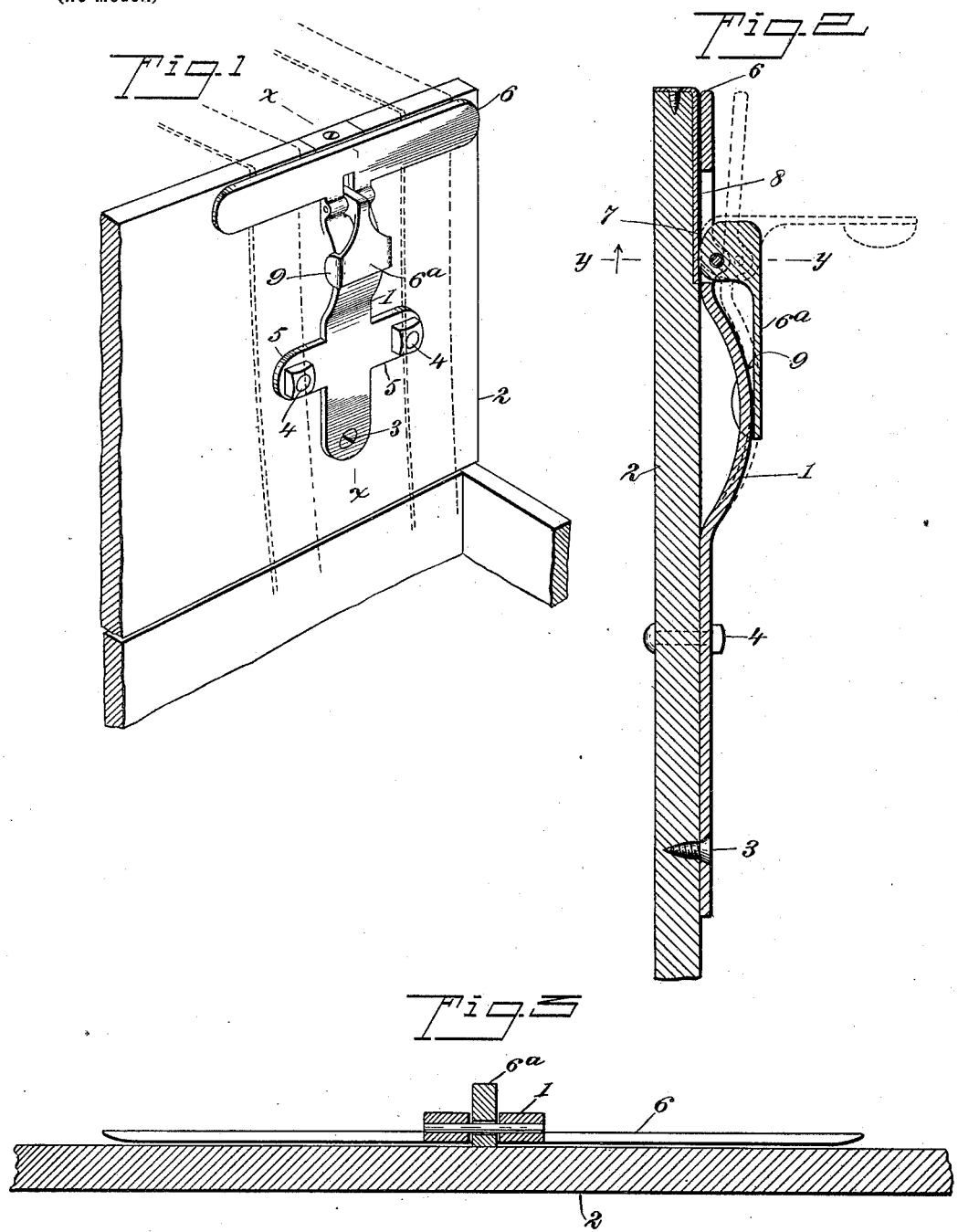
WITNESSES:
INVENTOR
John Granger
BY
ATTORNEYS

UNITED STATES PATENT OFFICE.

JOHN GRANGER, OF SPRINGER, TERRITORY OF NEW MEXICO, ASSIGNOR TO HIMSELF AND JOHN SUTHERLAND, OF SPRINGER, TERRITORY OF NEW MEXICO.

REIN-HOLDER.

SPECIFICATION forming part of Letters Patent No. 701,033, dated May 27, 1902.

Application filed February 21, 1902. Serial No. 95,076. (No model.)

*To all whom it may concern:*

Be it known that I, JOHN GRANGER, a citizen of the United States, and a resident of Springer, in the county of Colfax and Territory of New Mexico, have invented a new and Improved Rein-Holder, of which the following is a full, clear, and exact description.

This invention relates to improvements in devices for temporarily holding harness reins or lines; and the object is to provide a rein-holder of simple construction, that may be readily attached to a dashboard or other part of a vehicle and with which the reins may be easily engaged and clamped, especially when the harness-traces slack, so that the reins cannot be drawn out by a forward pull.

I will describe a rein-holder embodying my invention and then point out the novel features in the appended claims.

Reference is to be had to the accompanying drawings, forming a part of this specification, in which similar characters of reference indicate corresponding parts in all the figures.

Figure 1 is a perspective view of a rein-holder embodying my invention and showing the same as attached to a dashboard. Fig. 2 is a section on the line $x$ $x$ of Fig. 1, and Fig. 3 is a section on the line $y$ $y$ of Fig. 2.

The rein-holder comprises a spring shank portion 1, which will preferably be made of steel, and, as here shown, this shank portion is secured to a dashboard 2 by means of a screw 3 at the lower end and by means of bolts 4, passing through lateral extensions 5 and through the dashboard. Above these lateral extensions the shank is curved outward at its middle portion, so that the sides of an operating-lever may be easily grasped, as will be hereinafter described. A clamping-plate 6 extends across the upper end of the shank portion and is designed to receive the reins between it and the dashboard or other part of the vehicle, as indicated by the dotted lines in Fig. 1.

Pivoted to the shank is a lever 6ª, which has a cam portion 7, extended through a slot in the shank and engaging with a wear-plate 8. While this wear-plate is not wholly essential, it is preferable to employ it.

In operation when it is desired to engage the reins the lever is to be moved upward and its cam-surface engaging with the plate 8 will cause the clamping-plate 6 to be moved outward, as indicated in dotted lines in Fig. 2. After placing the reins in position the lever is to be again moved downward to the position indicated in Fig. 1. This lever has on opposite sides plates 9, which engage on opposite sides of the shank and form finger-pieces, so that the lever may be readily grasped and operated.

Having thus described my invention, I claim as new and desire to secure by Letters Patent—

1. A rein-holder comprising a shank portion of resilient metal, a clamping-plate extended in opposite directions from the upper end of said shank, and an operating-lever pivoted to the holder and having a cam-surface, substantially as specified.

2. A rein-holder comprising a shank of resilient metal, lateral extensions on said shank for receiving fastening devices, a clamping-plate extended transversely at the upper end of the shank, an operating-lever having a cam-surface, said operating-lever being pivoted to the holder, and a wear-plate with which said cam-surface may engage, substantially as specified.

3. A rein-holder comprising a shank portion of resilient metal, means for securing the same to a dashboard, a clamping-plate extended transversely at the free end of said shank, a lever pivoted to the shank and having a cam portion extended through an opening in said shank, and finger-pieces on opposite sides of said lever, substantially as specified.

In testimony whereof I have signed my name to this specification in the presence of two subscribing witnesses.

JOHN GRANGER.

Witnesses:
WILLIAM HOLMES,
MATAMORE G. KEENAN.